Sept. 10, 1929.  E. A. JOHNSTON ET AL  1,727,709
COTTON PICKER
Filed Jan. 6, 1927   6 Sheets-Sheet 1

Inventors.
E. A. Johnston, B. R. Benjamin, D. B. Baker,
By ........... Atty.

Sept. 10, 1929.  E. A. JOHNSTON ET AL  1,727,709
COTTON PICKER
Filed Jan. 6, 1927   6 Sheets-Sheet 5

Patented Sept. 10, 1929.

1,727,709

UNITED STATES PATENT OFFICE.

EDWARD A. JOHNSTON, OF CHICAGO, BERT R. BENJAMIN, OF OAK PARK, AND DAVID B. BAKER, OF CHICAGO, ILLINOIS, ASSIGNORS TO INTERNATIONAL HARVESTER COMPANY, A CORPORATION OF NEW JERSEY.

COTTON PICKER.

Application filed January 6, 1927. Serial No. 159,256.

This invention relates to cotton pickers, and more particularly to a cotton picker employing rotating picker stems which are projected into cotton plants as the machine is drawn along the ground. After the cotton is wound upon the picker stems they are withdrawn from the plants and subjected to the action of suitable devices for removing the cotton.

The essential requisites of a cotton picker of the type above mentioned are that it shall rapidly gather all mature cotton during the passage of the machine along a row of plants; that it shall perform this cotton gathering operation without material injury the the productive parts of the plants; that the machine be susceptible of accurate control to the end that all of the cotton plants operated upon may be kept within the operative zone of the picking mechanism; that the picker stems be so controlled and operated that they do not tear the cotton plant so as to collect an undue proportion of leaves, trash, and bits of stalk with the gathered cotton; and that the speed of operation of the picker stems be so correlated with the rate of progress of the machine over the field that immature parts of the cotton plant will not be injured so that they cannot become productive.

It is an object of this invention to provide a practical and successful cotton picker which will have the above mentioned attributes.

It is also an object of this invention to provide a novel cotton picker which is particularly advantageous in its use on account of the fact that it may be readily operated from a farm tractor and may be easily attached to and detached from such a tractor.

Another purpose of the invention is to provide a cotton picker of novel construction which may be easily operated by power take-off of a tractor, to the end that the timing of the picker stems may be accurately correlated with the rate of progress of the machine over the field.

Other objects of the invention will appear in the following description in which a preferred embodiment of the invention is shown.

In the drawings,—

Figure 3 is a side elevation of the picker mechanism detached from the frame illustrated in Figures 1 and 2. In this view a part of the casing enclosing the picker mechanism is broken away so that the internal arrangement of elements may be more clearly shown;

Referring to the drawings, an arched main frame is shown composed of the frame members 10 and 11. Preferably swingably supported beneath this main frame is a picker mechanism 12, the operative parts of which are connected to a telescoping drive shaft 13 driven by the power take-off 14 of a tractor having a transmission 15, a frame extension 16, supporting wheels 17, rear axles 18, and operator's station 19. The forward end of the main frame of the cotton picker is preferably connected to the frame extension 16 of the tractor by means of a ball and socket joint structure generally indicated at 20. For the purpose of adequately transmitting the drive from the power take-off of the tractor to the mechanism of the cotton picker under various positions of the two devices, the power take-off of the tractor is connected to the telescoping drive shaft 13 through the agency of the various universal joints 21, 22 and 23, a short drive shaft 24, and a countershaft 25 preferably journaled in the forward end of the picker frame.

Figure 1:
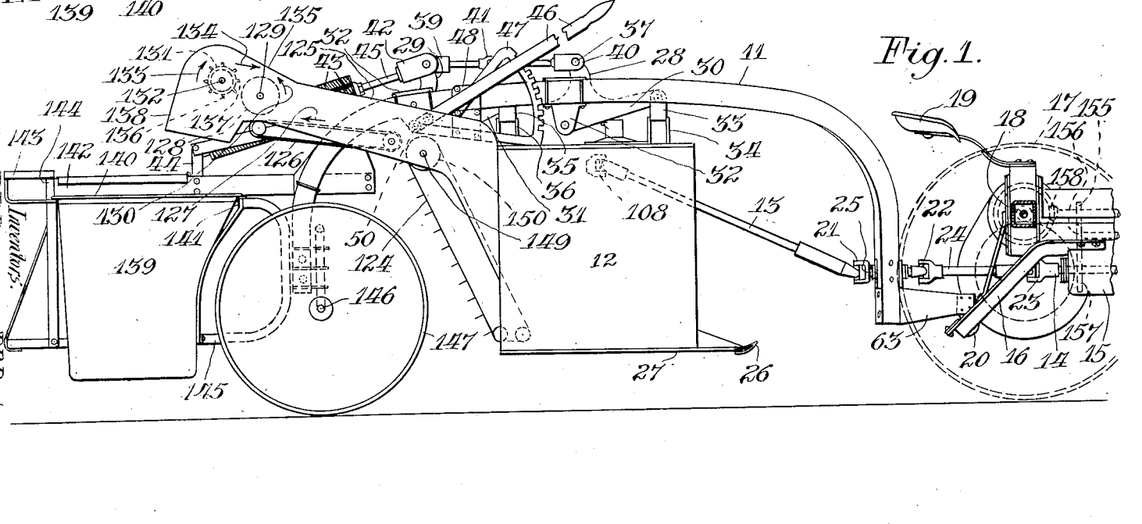
Figure 1 is a side elevation of the illustrative cotton picker showing the picker mechanism suspended as an auxiliary frame from the midportion of the arched main frame and illustrating the manner in which the forward end of the cotton picker is directly secured to a tractor, only a portion of which is shown in this figure.

In Figure 1 of the drawings, the picker mechanism is shown in its elevated or inoperative position, it being understood that the picker mechanism is lowered so that the gathering devices 26 and the bottom wall 27 are in contact with the ground when the machine is in operation. When in such operative position, the picker mechanism would offer an impracticable resistance to the draft, were it not for the fact that mechanism is provided for insuring that only a small proportion of the weight of the picker mechanism rests upon the ground. For accomplishing this purpose a structure for making a high proportion of the weight of the picker mechanism spring weight, is shown. This structure consists of bell cranks 28 and 29 having forwardly directed arms 30 and 31, respectively. The elbows of these bell cranks are shown as pivotally supported by hangers 32 fixedly secured to the main frame, the forward ends of the bell crank levers being pivotally attached to the picker mechanism by supports preferably consisting of interlocked yokes 33 and 34 for the forward end of the picker mechanism, and 35 and 36 for the rear end of the picker mechanism. The lower yokes 34 and 36 are preferably pivotally related to the picker mechanism by means of pivot pins which extend horizontally and longitudinally of the machine, the axes of these pins being in the same line, so that the entire picker mechanism may swing laterally about a single axis.

As shown in the drawings, the upper ends of the bell crank levers 28 and 29 are connected by means of pivot pins 37 and 38 to yokes 40 and 39, these yokes being in turn connected by a turnbuckle 41 for the purpose of adjusting the relative positions of the bell crank levers and for causing them to move in unison. The pivot pin 38 is also connected to a spring yoke 42 which is acted upon by a plurality of powerful tension springs 43 secured at their lower ends to a fixed portion of the machine herein shown as a standard 44. The springs are connected to the yoke 42 through the agency of a rod 45. The above mentioned parts are so arranged, and the springs 43 are so selected and adjusted that, if no means were provided for holding the bell cranks 28 and 29 in any set position, only a slight upward push upon the picker mechanism would cause it to be elevated. By way of example, if it be assumed that the entire picker mechanism 12 should weigh 500 pounds, the springs 43 are preferably so arranged that they would support something in the neighborhood of 475 pounds.

In order that the picker mechanism may be held in the position in which it is shown in Figure 1 of the drawings wherein the parts are so related that the machine may be advantageously transported from field to field, means is provided for holding the bell cranks 28 and 29 in such a position as that indicated. The means illustrated includes a hand lever 46 non-rotatably related to the pivot pin upon which the bell crank 29 is supported, the latter being also non-rotatively related to the same pivot pin. For the purpose of maintaining the hand lever 46 in any desired position of adjustment, a detent bracket 47 is shown, this bracket being fixedly secured to the frame by means of a plate 48.

Figures 5, 10, 11:
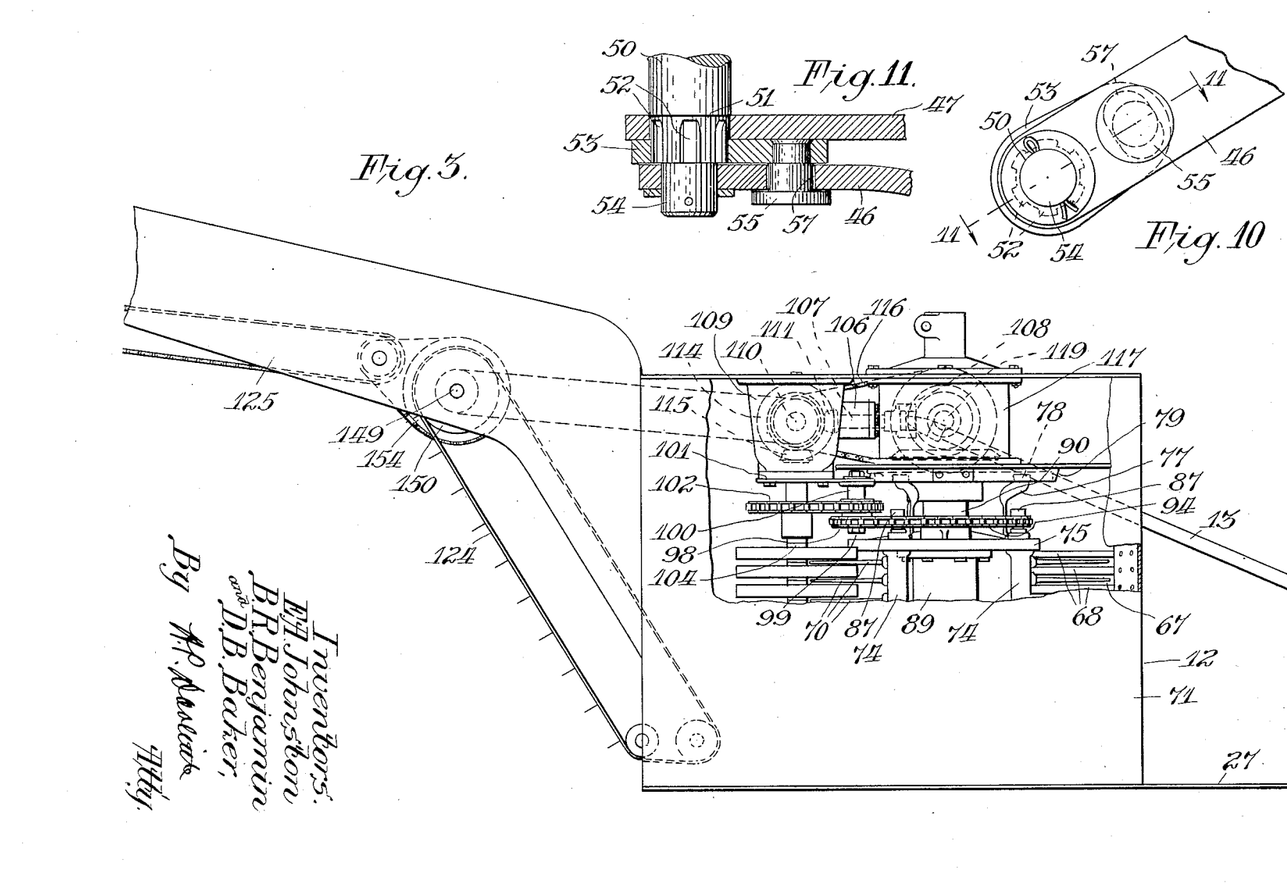
Figure 5 is a view somewhat in the nature of a plan, showing the arrangement of picker stems in the illustrative machine and also indicating the manner in which the picker stems are operated.
Figure 10 is a detached detail view of the lost motion mounting of the adjusting lever, showing the parts in side elevation.
Figure 11 is a sectional view of the parts shown in Figure 10, taken on the section line 11—11 of Figure 10.
Figure 5:
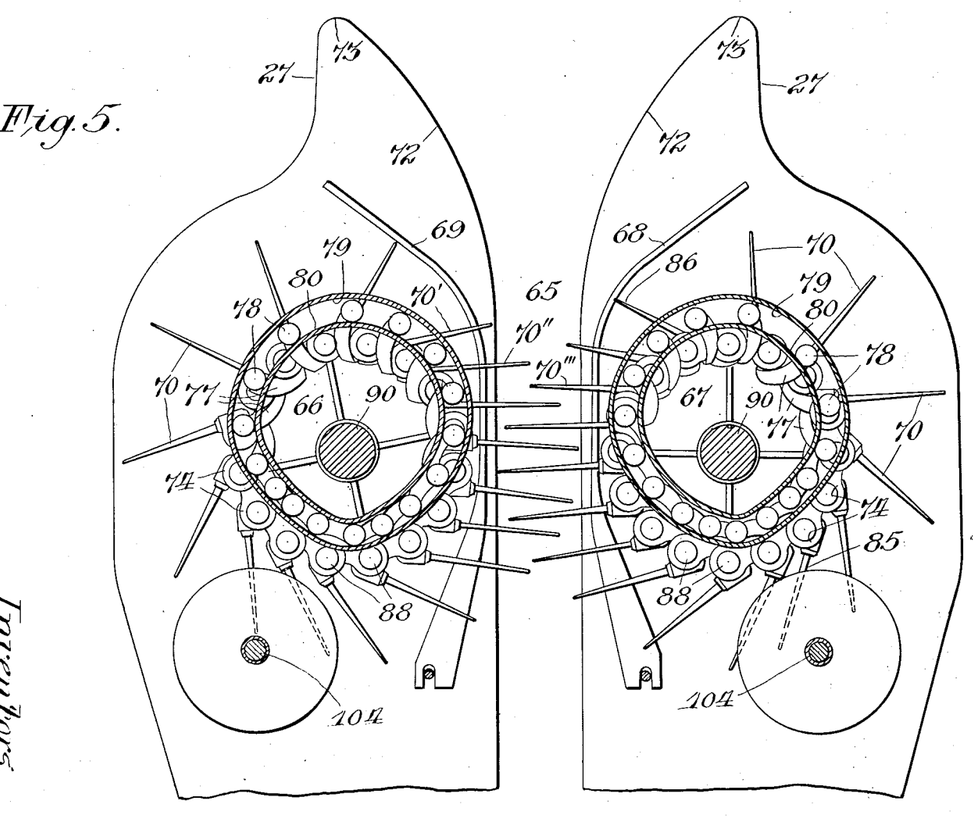

The mechanism for mounting the hand lever 46 upon the pivot pin of the bell crank 29 is illustrated in Figures 10 and 11 of the drawings. As here shown, the pivot pin 50 has a reduced end portion 51 in which splines 52 are formed. One leg of the detent bracket 47 is journaled upon the reduced portion 51 preferably sufficiently loosely to enable practically free rotation of the pivot pin 50. Externally of the bracket 47 a crank arm or pivot block 53 is mounted upon the reduced portion 51 and is preferably interlocked with the splines 52 of that portion. Beyond the reduced portion 51 the pivot pin 50 is formed with a further reduced portion 54, which forms a trunnion for the hand lever 46. The pivot block 53 is preferably bored to receive the locking pin 55, which has an enlarged portion passing through an arcuate slot 57 formed in the hand lever 46. The structure just described permits the picker mechanism illustrated in Figure 1 to have a floating movement when the machine is in operation. In other words, the picker mechanism is free to move vertically for any given position of the hand lever 46, the limitation of that free movement being determined by the length of the slot 57 in the lever 46.

Figure 2:
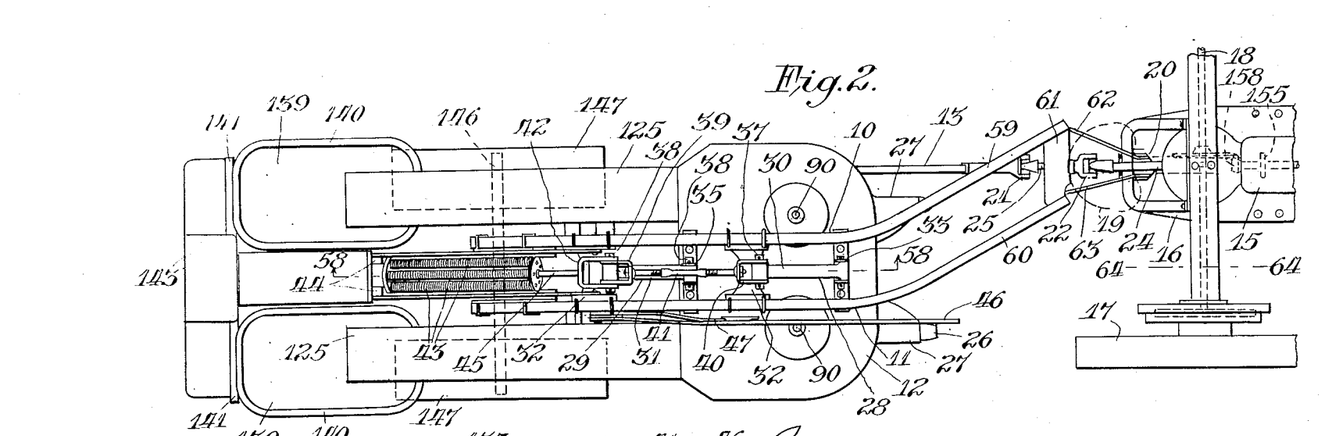
Figure 2 is a plan view of the machine as illustrated in Figure 1, the offset relationship of the cotton picker with regard to the tractor being particularly shown in this view.

The axis about which the picker mechanism is free to swing laterally of the path of movement of the frame and the tractor is indicated by the section line 58—58 in Figure 2 of the drawings. This manner of moving the picker mechanism materially reduces the cost of operation of a machine of the class disclosed, and also improves its operation. It allows the picker mechanism to yield laterally when undue resistance is encountered by the picking elements described below, and it enables the picker mechanism to cover a row of plants adequately, in spite of unskillful operation, as would occur when the machine is so steered that the picker mechanism would otherwise be pulled away from the plants.

The arrangement of elements in the illustrative cotton picker is such that the central logitudinal line of the machine and of the picking mechanism is offset relative to the point of application of the draft force. This is indicated clearly in Figure 2 of the drawings. As here shown, the frame members 10 and 11 have offset forward portions 59 and 60 connected at their forward ends by a strut 61, which is supported by draft members 62 and 63 preferably converging forwardly so as to be secured to a ball and socket joint member cooperating with the member 20 upon the tractor frame. The tractor illustrated in Figure 2 is one which straddles two rows of plants, the center line of one row of plants being approximately illustrated by the line 64—64, the center line of the plants being preferably directly underneath the axis about which the picker mechanism swings from the main frame.

In order that a straight line drive may be approximated between the power take-off of the tractor and the operative parts of the cotton picking mechanism, the shaft 13 is connected at one side of the picker mechanism, as illustrated in Figure 2. This figure of the drawings clearly indicates a straight line drive between the power take-off of the tractor and the picker mechanism. It is to be appreciated that the picker mechanism, as shown in Figure 1 of the drawings, is elevated considerably above its operative position and that when moved to operative position, the shaft 13 may approach more closely to a horizontal position, thus affording substantially a straight line drive, both horizontally and vertically.

The type of picking elements employed in the picking mechanism is indicated in Figure 5 of the drawings. As here shown, a plant passage-way 65 is provided between two batteries 66 and 67, respectively, of rotating picker stems. These picker stems are moved in an endless path, as is clearly indicated in this figure of the drawings. They are projected into the plants which are compressed by the compression bars 68 and 69 within the passage-way 65. The picker stems 70 are provided with barbs, as is well known in the art, in order that the cotton may be wound upon the picker stems as the latter are rotated. The picker stems are rotated only while they are within the plants compressed within the passage-way 65. The picker stems are, therefore, withdrawn from the plant and the cotton removed therefrom during the movement of the stems around to a position wherein they again enter the row of plants.

As indicated in Figure 3 of the drawings, each battery of the picker stems is surrounded by a casing 71, the bottom walls of the casings being preferably shaped at their forward ends so as to provide gathering platforms 72. The forward ends, or prows, 73 of these platforms contact with the ground as the machine is in operation, so as to guide and direct all branches of the plants to the passage-way 65.

Figure 9:
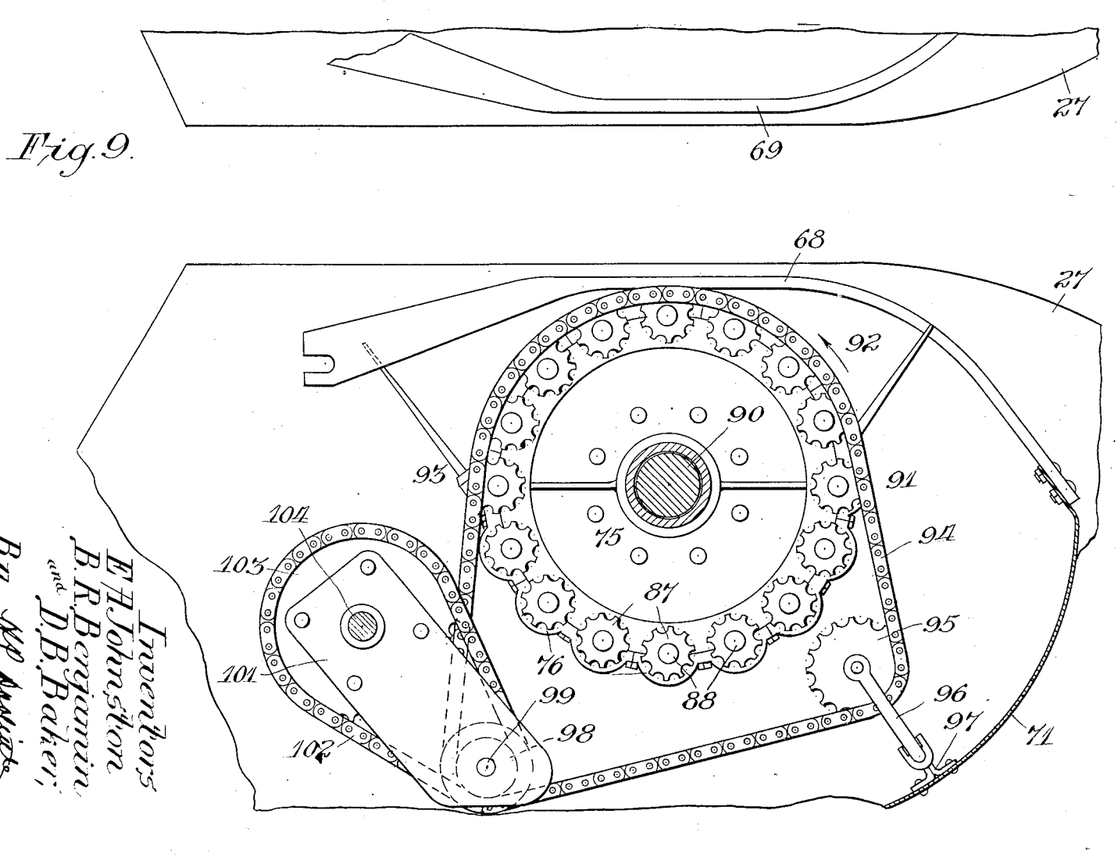
Figure 9 is a plan view of one of the batteries of picker stems for the picker mechanism, showing particularly the manner in which the picker stems are driven.

In order that the mechanism illustrated in Figure 5 may be more readily understood, it is here explained that the picker stems 70 are carried by picker bars 74. Each picker bar carries a series of vertically aligned picker stems. The picker bars are mounted in a circular row in the head 75 of the battery 67. The manner of rotatably mounting the tops of the picker bars in the head 75 is indicated in Figure 9 of the drawings. The head 75 is journaled so as to rotate upon a vertical axis, and the picker bars are detachably and rotatively mounted in the periphery of the head by means of detachable bearing clips 76. Each picker bar has an upwardly directed extension 77 preferably carrying a roller 78 which is guided within parallel cam tracks 79 and 80. It is the shape of the cam tracks which governs the paths of movement of the picker stems and also controls the angularity of projection of the stems relative to the centers of the batteries 66 and 67.

Figure 6:
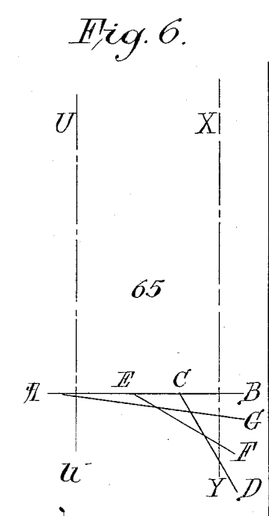
Figure 6 is a diagrammatic view indicating the method of operation of the picker stems.

It is important that the picker stems be not moved bodily forward or backward after they have entered cotton bearing portions of the plants. The manner of operation of the illustrative picker stems, whereby such movement is prevented, will be described with reference to Figures 6, 7, and 8 of the drawings. Referring to Figure 6 of the drawings, the parallel lines U—W and X—Y illustrate the area covered by a section of a row of cotton plants. The line A—B is normal to the lines U—W and X—Y and illustrates the path of movement of the center of the end of a picker stem through a row of plants. The line C—D illustrates in an exaggerated manner the position of a picker stem as it approaches the plant passage-way 65. The point C illustrates the center of the end of the picker stem and the line C—D represents the longitudinal axial center of the picker stem. The position indicated by the line C—D may be defined as illustrating the position of the individual picker stem 70' of Figure 5 of the drawings. As the picker stem 70' is further projected into the plants, its position changes to such a position as that indicated by the line E—F in Figure 6 of the drawings. This position may be taken as comparable to that indicated by the individual picker stem 70″ in Figure 5 of the drawings. It is to be here noted that the point E, representing the center of the forward end of the picker stem, is still lying within the line A—B. The line A—G illustrates such a position of a picker stem as that indicated by the picker stem 70‴ in Figure 5 of the drawings, the center of the end of the picker stem still remaining in the line A—B.

Figure 7:
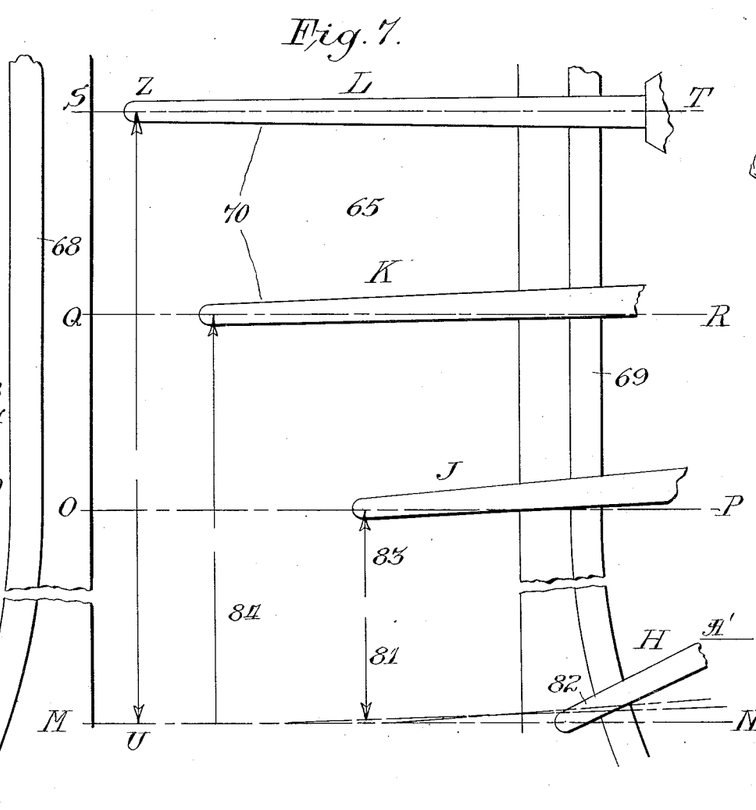
Figure 7 is also a diagrammatic view showing a picker stem in its various successive positions, and illustrating an important point in the operation of the machine herein described.

The picker stems may operate in the manner above indicated by reason of the fact that they are moved rearwardly relative to the picker casings at approximately the same rate of speed as that at which the machine traverses the ground forwardly. This will be clear when Figure 7 is referred to. In this figure a portion of the plant passage-way between the compression bars 68 and 69 is indicated. Four successive positions of a single picker stem are indicated at H, J, K and L. Four equi-distant parallel lines running transversely to the longitudinal center of the passage-way 65 are indicated. These lines are M—N, O—P, Q—R, and S—T. The entire cotton picker is moving in the direction indicated by the arrow 81, and the picker stem 82 is being projected into the passage-way 65 and moved in the direction of the arrow indicated at 83. When the entire machine has moved forward a distance equal to the perpendicular distance between the lines M—N and O—P, the picker stem 82 has moved from the position H to the position J, a distance, between point centers, equal to the distance which the machine has moved in the opposite direction.

When the machine, carrying with it the compression bars 68 and 69, has moved forward in the direction of the arrow 84 a distance equal to the perpendicular distance between the lines M—N and Q—R, the picker stem 82 has been projected into the passage-way 65 and has moved from the position H to the position K. The distance which the center of the point of the picker stem has moved relatively in a direction opposite the movement of the entire machine is equal to the perpendicular distance between the lines M—N and Q—R. Thus, the picker stem has moved rearwardly relative to the machine a distance equal to the distance which the entire machine has moved forward relative to the cotton plants. The effect of this action is that the point of any given picker stem remains within a given path of movement transverse to the cotton plants. The picker stem is not pulled forwardly or rearwardly relative to the plants so as to unduly tear or injure the plants.

In further explanation of the diagrammatic illustration in Figure 7 it may be said that when the picker stem 82 has moved from the position H to the position L, its point has moved relatively rearwardly a distance equal to the distance U—Z. In reality what happens is that the entire cotton picker has moved forwardly a distance equal to Z—U while the picker stem is so moved relative to the compression bars 68 and 69 that its point remains in the same path transversely of the plants located between the compression bars.

Figure 8:
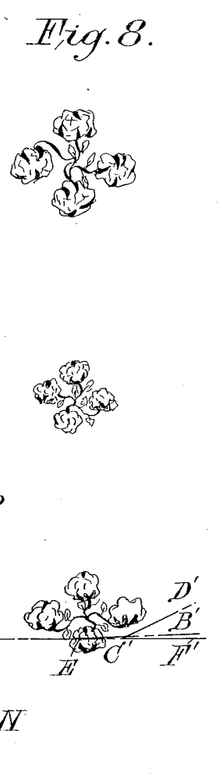
Figure 8 is a plan view illustrating a part of a row of plants to be operated upon by the machine.

In Figure 8 of the drawings, a portion of a row of cotton plants is illustrated in plan. The line A′—B′ indicates a path of movement of the point of a picker stem transverse to the line of the row of plants. The center of the point of the picker stem remains in the same path and in the same plant as the picker stem is projected into the passage-way of the picker mechanism and into the plants. In this view line C′—D′ indicates the axis of a picker stem as it approaches a position where in it begins to be projected into the plants, and line E′—F′, a position in which the same picker stem is partially projected into the plants. From the above description taken in connection with the accompanying drawings it will be appreciated that the cam tracks 79 and 80 control the angularity of projection of the picker stems so that they may be operated in the described manner. These cam tracks are also so designed as to move the picker stems from the position indicated at 85 in Figure 5 to that indicated at 86 in the same figure in such a manner that there will be no twisting and breakage of the picker stems due to irregularly accelerated movement. The picker stems are preferably rotatably mounted in the picker bars 74 and are connected by suitable gearing with driving elements herein shown as sprocket wheels 87, non-rotatively secured upon shafts 88, which are journaled in vertical positions within the picker bars. The head 75 is a part of a drum which carries one of the batteries of picker stems. This head is connected by means of a tubular column 89 with a lower head similarly constructed and preferably journaled in the bottom wall of the picker mechanism. The picker bars and the picker stems are carried about the vertical axis of the picker drum by means of a shaft 90 upon which the drum heads are fixedly mounted. As the drum head is rotated, the picker bars with their accompanying sprocket wheels 87 are moved in an endless path indicated clearly in Figure 9 of the drawings.

Further reference to Figure 9 of the drawings will make it clear that as any single sprocket wheel 87 moves from the position indicated at 91 in the direction indicated by the arrow 92 toward the position indicated at 93, the sprocket wheel will be rotated by reason of its contact with a sprocket chain 94, which is preferably so mounted as to be out of contact with the several sprocket wheels for the remainder of their path of movement.

As illustrated in Figure 9, the sprocket chain 94 is held out of contact with some of the sprocket wheels 87 by means of a sprocket idler wheel 95, preferably journaled within the ends of a yoke 96 carried by a pivotal support 97 secured to the casing 71. At another position the sprocket chain 94 is held out of engagement with some of the sprocket wheels 87 by means of a driving sprocket wheel 98, preferably mounted upon a counter-shaft 99 journaled in a support 100 depending from the wall 101 of the picker mechanism. The counter-shaft 99 is driven at appropriate speed by means of another sprocket wheel located on the counter-shaft 99, this other sprocket wheel being in turn run by a sprocket chain 102 meshing with a large sprocket wheel 103 upon a driving shaft 104.

The operating connections for driving the various parts of the cotton picker will now be described. Referring to the disclosure of Figures 3 and 4 of the drawings, the drive shaft 13 for transmitting power to the parts of the picker mechanism is shown as entering the casing 71 through an enlarged opening 105 preferably of sufficient size to take care of the different positions at which the shaft 13 must operate when the picker mechanism moves from its highest position as indicated in Figure 1 to its operative position when its bottom wall 27 is in contact with the ground, and also to take care of swinging movements of the picker mechanism transversely of the main frame. Within the picker casing 71 there is located a gear casing 106 in the forward side of which is journaled a short shaft 107, the forward end of the shaft being connected by means of a universal joint 108 with the rearward end of the driving shaft 13. In an opposite part of the picker casing 71 there is fixed a second gear casing 109. The gear casings 106 and 109 rotatively receive a transverse main shaft 110, which is journaled in both casings. As shown, the shaft 107 carries at its rearward end a bevel pinion 111 meshing with a bevel gear 112 non-rotatively fixed upon the shaft 110. On the opposite side of the bridge 113 in the casing 106 the shaft 110 carries a second bevel gear 114, likewise non-rotatively fixed on the shaft 110 and meshing with a bevel gear 115 fixed upon the upper end of the vertically extending driving shaft 104.

Intermediate the casings 106 and 109, the transverse shaft 110 carries a sprocket wheel around which is trained a sprocket chain 116 for transmitting power to the picker drums through the picker drum shafts 90. Within the casing 71 of the picker mechanism and located above the picker drums are fixed gear casings 117 and 118. These gear casings rotatively receive a transverse shaft 119 journaled in the casings carrying pinions 120 and 121 at its ends. These pinions mesh respectively with bevel gears 122 and 123 carried by and keyed to the upper ends of the picker drum shafts 90.

Figure 1 of the drawings shows elevators in the form of endless conveyers 124 for transferring the cotton upwardly to cleaning mechanisms mounted within the auxiliary casings 125. The cotton elevated by the conveyers 124 is received by substantially horizontal conveyers 126, the upper runs of which move in the direction indicated by the arrow 127. The conveyers 126 bring the cotton into contact with carding rollers 128 fixed upon shafts 129 and journaled within the casings 125. The carding rollers 128 operate in a counter-clockwise direction, as indicated by the arrow 130. The cotton is carried upward by the projections upon the roller until it comes within the zone of action of the ejector and blowers 131. These blowers are mounted upon shafts 132 and are rotated in a clockwise direction, as indicated by the arrow 133.

High speed rotation of the ejectors and blowers 131 creates blasts of air moving in the direction indicated by the arrow 134. These blasts of air have the effect of blowing loose parts of leaves and other trash through openings or gratings which are provided in the upper walls of the casings 125 and 135. The cotton being impaled upon the spikes of the carding rollers 128, is held so that it will not be blown away by these blasts of air. The blowers and ejectors 131 are provided with radial paddles 136 which bat the cotton downwardly when they come into contact with it at a position such as that indicated at the point 137. The cotton is thus forcibly ejected through downwardly projecting chutes 138 so that it falls into large receptacles 139 which are preferably constructed as canvas bags, the tops of which are secured to metallic frames 140. The frames 140 are easily slidable over tracks 141 into the positions shown in Figure 2 of the drawings. The tracks 141 are preferably constructed of angle iron secured to rearwardly extending frame bars 142. The frame bars 142 also provide supports for an attendant's station 143. Vertical standards 144 extend downwardly into other frame bars 145 which at their forward sides may be secured to the members 10 and 11 of the main frame.

From an inspection of Figure 2 of the drawings it will be evident that the auxiliary casings 125, the cleaning mechanisms, and the receptacles 140 are so spaced as to provide a continuation of the plant passage-way 65. The rearward ends of the members 10 and 11 of the main frame are connected at their rear ends by an arched axle 146 which provides an adequate vertical clearance for the cotton plants, and cooperates with the other parts of the machine to afford an unobstructed plant passage-way through the entire machine. The lower ends of the arched axle 146 have the rear supporting wheels 147 journaled thereon.

Figure 4:
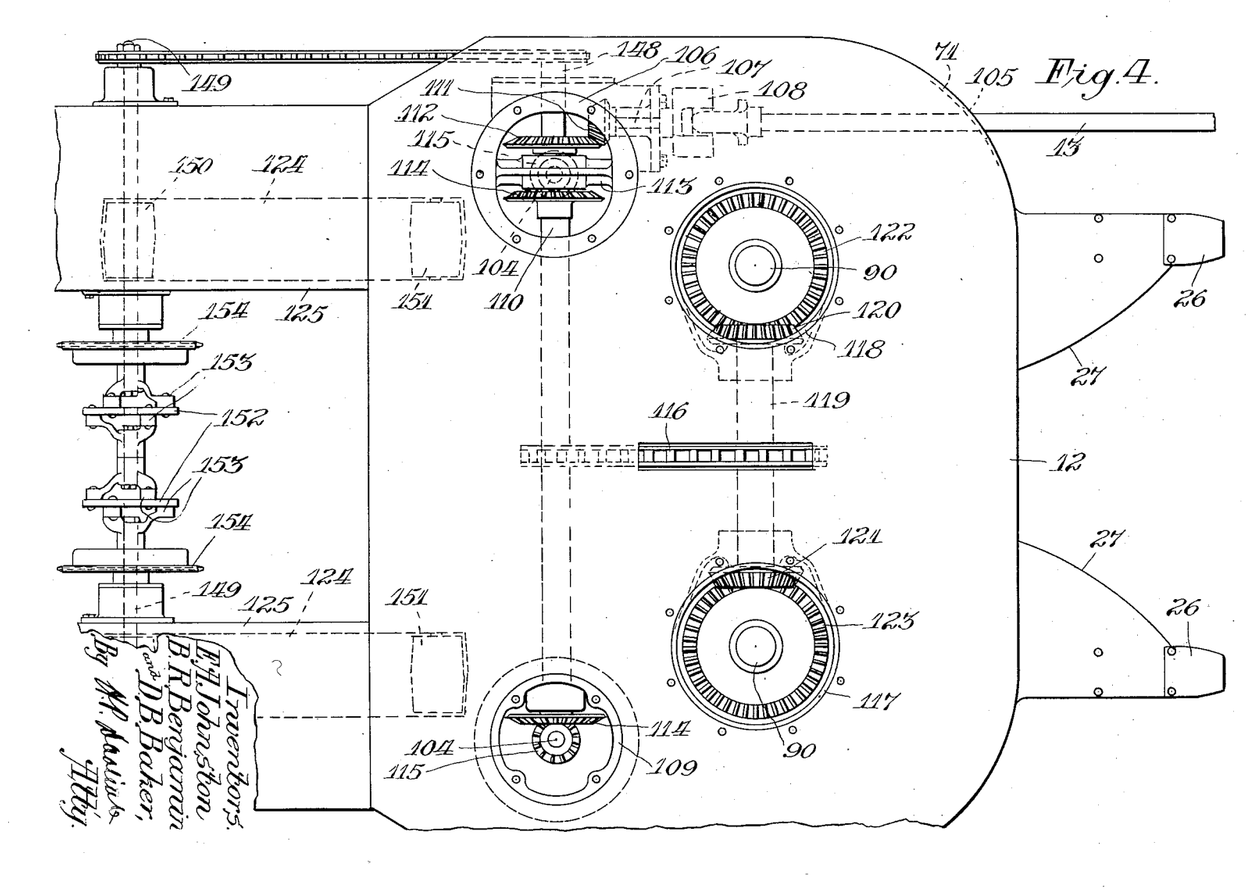
Figure 4 is a plan view of the picker mechanism showing particularly the arrangement of elements for operating the various parts of the picker mechanism.

As indicated in Figure 4 of the drawings, the main transverse shaft 110 is provided at one end with a pulley or sprocket wheel 148 connected by an endless driving member with a similar wheel mounted upon the elevator shaft 149. This shaft carries rollers 150 for driving the endless conveyer 124, a roller of similar design for the lower ends of the conveyer 124 being indicated at 151. Intermediate the casings 125 the elevator driving shafts 149 are connected by flexible driving connections 152, the spiders 153 being secured on opposite sides of these flexible driving connections. The shafts 149 non-rotatively carry sprocket gears 154 which may be connected with the shafts 129 and 132 for driving the carding rollers 128 and blowers and ejectors 131.

In order to maintain uniform coordination between the forward speed of the cotton picker as a vehicle and the rearward movement of the picker stems relative to the other parts of the picker, the power take-off 14 is directly driven by a gear 157 non-rotatively secured to the power take-off shaft within the transmission. This gear is in constant connection with a gear 155 by means of an interposed gear 156 which meshes with the gears 155 and 157. The gear 155 is non-rotatively mounted upon the propeller shaft which carries a driving pinion 158 meshing with and driving the ring gear of the differential mechanism of the rear axle of the tractor. Inasmuch as the rate of rotation of the power take-off controls the rearward movement of the picker stems relative to the remainder of the picker, and inasmuch as the propeller shaft controls the rate of advance of the vehicle, there is constantly maintained the proper coordination in order that the above indicated results may be accomplished.

Although the invention has been described with relation to a particular structure, it is to be understood that the invention is not limited thereto, but that it is capable of use in various combinations and sub-combinations coming within the scope of the appended claims.

What is claimed is:

1. A device of the class described comprising, in combination, a wheel supported main frame arched upwardly at its mid-portion, cotton picker mechanism located beneath the arched portion of the main frame, means on the frame for supporting said mechanism in position, pivotal frame supporting connections at the forward end of the main frame adapted to be pivotally mounted upon a tractor, and power transmitting connections for transmitting continuous rotary movement from the tractor to the cotton picker mechanism, said power transmitting connections including a part journaled in and supported by the forward end of the main frame.

2. A device of the class described comprising, in combination, a main frame, supports for the rear end of the main frame, pivotal supporting connections at the forward end of the main frame adapted to be connected to a tractor so as to permit relative movement of the main frame and the tractor, cotton picking mechanism swingably supported beneath the main frame, power transmitting connections operatively connecting the cotton picking mechanism and the tractor, said power transmitting connections being supported by the main frame and including pivoted parts permitting swinging movement of the cotton picking mechanism relative to the main frame while the former is being constantly driven.

3. In a machine of the class described comprising, in combination, a forwardly and rearwardly arched frame, supporting wheels attached to the rear portion of the frame, cotton picking mechanism suspended from the frame, a supporting member secured to the forward end of the frame, a cooperating frame extension member supported by a tractor and pivotally supporting the forward end of the frame, a power transmitting shaft journaled in the forward end of the frame, a telescoping drive shaft connecting the first mentioned shaft with the cotton picking mechanism for operating the latter, and power transmitting connections between the first mentioned shaft and the power take-off on the tractor.

4. A device of the class described comprising, in combination, a wheel supported frame having its forward end pivotally supported upon a tractor, cotton picking mechanism carried by the frame and power transmitting connections between the cotton picking mechanism and the tractor for operating the cotton picking mechanism, said power transmitting connections including telescoping shafts and universal joints which permit the swinging of the cotton picking mechanism laterally relative to the frame.

5. A cotton picker comprising, in combination, a main frame, picker mechanism constituting an auxiliary frame and laterally swinging means connecting the picker mechanism to the main frame so that the picker mechanism can swing pendulously laterally of the main frame, a pivotal support connecting the forward end of the main frame to a tractor so as to support the main frame upon the tractor, and power transmitting connections taken power from the tractor for driving the picker mechanism.

6. A cotton picker comprising, in combination, a main frame, picker mechanism located beneath the main frame, pivotal connections between the main frame and the picker mechanism permitting the picker mechanism to swing pendulously laterally of the main frame, wheel supports for the rearward end of the main frame, pivotal connections for supporting the forward end of the main frame upon a tractor, and power transmitting connections for operatively connecting the picker mechanism with the power take-off of the tractor, said power transmitting connections including a shaft journaled in the main frame.

7. A cotton picker comprising, in combination, a main frame, supporting wheels secured to the main frame at its rear, pivotal draft connections secured to the forward end of the main frame and adapted to be pivotally mounted upon the frame of a tractor, the forward portion of the main frame being offset so that the pivotal draft connections are located at a position substantially beyond and at one side of the remainder of the main frame, the pivotal connections of the main frame being pivoted to the tractor directly below the power take-off of the tractor so as to afford a straight line drive from the power take-off to the cotton picker, power transmitting connections between the forward end of the main frame and the power take-off of the tractor movably connected so as to permit the turning of the tractor relative to the main frame, a short power shaft journaled in the forward end of the main frame and operatively connected to said power transmitting connections, picker mechanism swingably mounted upon the main frame so as to be capable of oscillation transversely of the path of movement of the cotton picker, and a second set of power transmitting connections between the picker mechanism and the forward end of the main frame including flexible and extensible elements to continuously transmit power to the picker mechanism regardless of the position to which it is swung relative to the main frame.

8. A cotton picker comprising, in combination, an unstable wheel supported main frame having forward portions offset laterally of the frame, draft connections secured to the forward end of the frame and adapted to be pivotally supported upon a tractor, a line parallel with the path of movement of the machine and passing through the axis of the pivotal connection with the tractor being substantially to one side of the main portion of the frame, cotton picking means suspended from the frame, power transmitting connections, constituting a direct drive to the cotton picking means from the power take-off of the tractor, a shaft included in said power transmitting connections and journaled in the forward end of the frame, and connection between the main frame and said cotton picking means for allowing the latter to have substantially free movement transversely of the main frame, a part of said power transmitting connections including universal joints and connecting said shaft and said cotton picking means so that the latter may be constantly operated regardless of its position with respect to the main frame.

9. A cotton picker comprising, in combination, cotton picking means including a pair of parallel rearwardly and upwardly extending devices for conveying the picked cotton, a wheel supported main frame extending from the rear upwardly between said devices and thence downwardly to its forward end, pivotal connections between said cotton picking means and said frame so that the former may have substantially free movement transversely of the frame, draft devices secured to the forward end of the frame and adapted to be pivotally supported upon a tractor, a shaft journaled at the forward end of the frame, a second shaft extending between the forward end of the frame and the cotton picking means, said second shaft comprising flexibly connected sections and being operatively connected at its forward end to the first named shaft and at its rearward end to operative devices of the cotton picking means so as to transmit movement to said means regardless of its swinging movement relative to the frame, and a third shaft having telescoping sections connected with the first named shaft and to a power take-off on the tractor, said shafts constituting a direct drive passing substantially directly above the point of application of draft to the frame.

10. A cotton picker comprising, in combination, an unstable wheel supported frame having draft connections at its forward end to adapt it to be pivotally supported upon a tractor, cotton picking means carried by the frame, connections between the frame and the picking means for allowing the latter to have substantially free movement relative to the frame and transversely thereof, a forward part of the frame being offset laterally to the remainder of the frame so as to place the point of application of the draft substantially to one side of the path of movement of the frame, and power transmitting connections extending substantially directly forwardly from the picking means to the power take-off of the tractor, said power transmitting connections being held closely adjacent to the point of pivotal mounting of the frame upon the tractor and being adapted to transmit power to the cotton picking means regardless of the angular position of the tractor relative to the cotton picker and regardless of the swinging movement of the picking means relative to the frame.

11. A cotton picker comprising, in combination, a wheel supported frame, draft connections at the forward end of the frame adapted to pivotally support the frame upon a tractor, the forward portion of the frame being offset relative to the remainder of the frame so that the draft connections are located at a position substantially laterally removed from the remainder of the frame, supporting means on the frame, cotton picking means pivoted to said supporting means and suspended beneath the main frame so as to be swingable transversely of the main frame, and power transmitting connections affording a direct drive to the cotton picking means from the power take-off of the tractor.

12. A cotton picker comprising, in combination, a frame arched in a fore and aft direction, picker mechanism swingably supported beneath the frame, operative parts for the picker mechanism, a telescoping drive shaft located between the forward leg of the frame and the picker mechanism so as to partake of the swinging movement of the picking mechanism and to continuously transmit power thereto regardless of that swinging movement, a driven shaft journaled in the forward end of the main frame and operatively connected to said telescoping shaft, and power transmitting connections between said second mentioned shaft and the power take-off of the tractor, said power transmitting connections permitting free turning of the tractor relative to the frame without interruption of the flow of power to the picker mechanism, and a draft device affording a pivotal support on the frame of a tractor at a point closely adjacent to the line of power transmission.

13. A cotton picker comprising, in combination, an unstable wheel supported frame, draft connections secured to the forward end of the frame and adapted to support the frame upon a tractor, the main portion of the frame being offset laterally relative to the draft connections, the frame consisting of substantially parallel beams narrowly spaced and arched so as to provide downwardly extending legs at the forward and rearward ends of the frame, cotton picking means swingably suspended substantially midway of the frame, a power transmitting shaft journaled in the forward end of the frame, power transmitting connections connecting the forward end of said shaft to the power take-off of a tractor, and power transmitting devices so connecting the rearward end of said shaft with the cotton picking mechanism that the picking mechanism is constantly driven regardless of its vertical position with respect to the main frame and regardless of its swinging movement with respect to the main frame.

14. A cotton picker comprising, in combination, an arched wheel supported frame having a laterally offset forward portion, draft connections secured to the forward portion of the frame and adapted to pivotally support the frame upon a tractor, cotton picking mechanism swingably suspended from the main frame, power transmitting connections partially carried by the forward end of the main frame and extending directly rearwardly from the position above the draft connections to the cotton picking mechanism, said power transmitting connections allowing free swinging movement of the cotton picking mechanism relative to the frame.

15. A cotton picker comprising, in combination, a wheel supported frame, draft connections at the forward end of the frame adapted to pivotally support the forward end of the frame upon a tractor, cotton picking mechanism carried by the frame, said picking mechanism including rotating picker stems, means for projecting the picker stems into a row of cotton plants traversed by the picking mechanism, means for rotating the picker stems while they are within the plants, timing means for moving the picker stems rearwardly relative to the frame at approximately the same rate of speed at which the frame is pulled forwardly, power transmitting connections operatively connected to said timing means and extending forwardly to the tractor, a power take-off shaft upon the tractor, gearing connecting the power take-off shaft and the driving wheels of the tractor so that they are constantly operated at speeds bearing a fixed relation to each other, and means connecting said power transmitting connections to said power take-off shaft.

16. A cotton picker comprising, in combination, picker stems, means acting upon the picker stems to cause them to remain in fixed position transversely of a cotton plant row as the picker is drawn forwardly, a tractor connected to the cotton picker for propelling it forwardly and for operating said means so that the picker stems remain in such fixed position, a power take-off upon the tractor operatively connected to said means, and gearing connecting said power take-off with the drive wheels of the tractor so that a constant relationship between the rates of rotation of the drive wheels and the power take-off is maintained.

17. A cotton picker comprising, in combination, a frame adapted to straddle a row of cotton plants, a tractor, the forward part of said frame being offset laterally and connected to the tractor at a point substantially midway of the width of the tractor, cotton picking mechanism carried by the frame, said cotton picking mechanism including rotating picker stems, means for rotating the picker stems, means for projecting the picker stems into the cotton plants and withdrawing them therefrom, said last named means operating to move the picker stems rearwardly relative to the frame at substantially the same rate of speed at which the tractor and frame are moving forwardly, a power take-off shaft upon the tractor, gearing connecting the power take-off shaft and the drive wheels of the tractor so that a constant ratio is maintained between the rates of movement of the drive wheels and the power take-off shaft, and power transmitting connections constituting a direct drive between the cotton picking means and the power take-off of the tractor.

18. A cotton picker comprising, in combination, picker mechanism provided with ground engaging runners, draft devices for connecting the picker to a tractor, and power transmitting devices connected for taking power from the tractor for driving the picker mechanism.

19. A cotton picker comprising, in combination, picker mechanism provided with a passage-way for cotton plants, ground engaging runners for the picker mechanism, draft means for connecting the picker to a tractor, and power transmitting connections including a telescoping shaft for driving the operative parts of the picker mechanism, said power transmitting connections taking power from the power take-off of the tractor.

In testimony whereof we affix our signatures.

EDWARD A. JOHNSTON.
BERT R. BENJAMIN.
DAVID B. BAKER.